MAGNETIC FIELD TYPE STEP DIODE

Filed Sept. 12, 1962 2 Sheets-Sheet 1

INVENTOR.
HIROSHI MIZUTANI
BY Eugene E. Geoffrey Jr.
ATTORNEY

INVENTOR.
HIROSHI MIZUTANI
BY Eugene E. Geoffrey, Jr.
ATTORNEY

United States Patent Office 3,209,169

Patented Sept. 28, 1965

3,209,169

MAGNETIC FIELD TYPE STEP DIODE

Hiroshi Mizutani, 118 Nagaicho Higashi, 5-chome, Sumiyoshi-ku, Osaka, Japan

Filed Sept. 12, 1962, Ser. No. 223,216
Claims priority, application Japan, Sept. 27, 1961, 36/35,046
6 Claims. (Cl. 307—88.5)

This invention relates to counting devices and more specifically to a novel and improved magnetic field type step diode useful, among other things, for high speed counting and switching operations. Known counting and switching devices heretofore used, as for instance the decatron, are generally slow speed devices requiring high operating voltages and affording relatively short lives. The step diode in accordance with this invention overcomes the foregoing disadvantages and in addition is relatively small and compact as compared with the decatron, is relatively light in weight and affords selective directivity of the counting or switching operation.

Another object of the invention resides in a novel and improved step diode that is characterized by dependability, efficiency and relatively long life.

Still another object of the invention resides in a novel and improved electron device readily applicable for use in performing addition and subtraction, switching operations and frequency reduction.

The above and other objects of the invention will become more apparent from the following description and accompanying drawings forming part of this application:

Figure 4A:
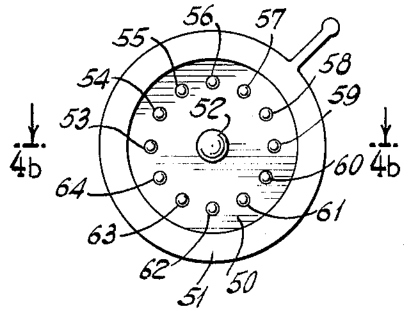

FIGURE 4*a* is a bottom view of a step diode in accordance with the invention.

Figure 4B:
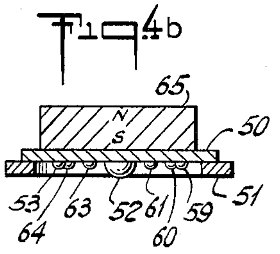

FIGURE 4*b* is a cross-sectional view of FIG. 4*a* taken along the line 4*b*—4*b* thereof.

Figure 5:
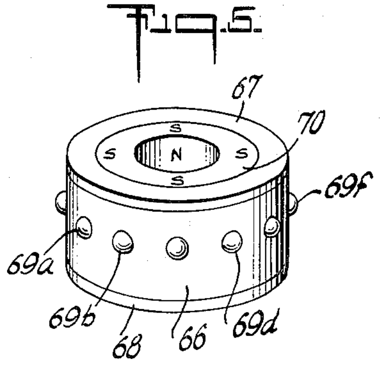

FIGURE 5 is a perspective view of another embodiment of the invention.

Figure 6:
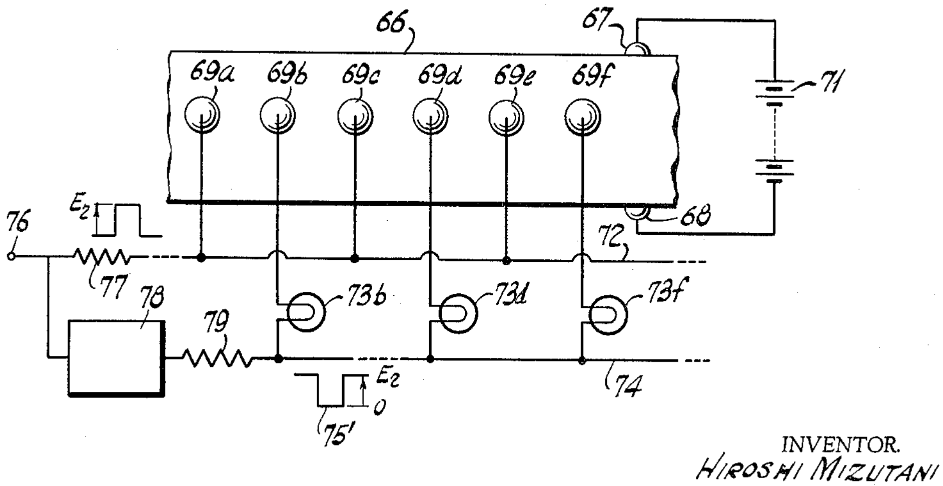

FIGURE 6 illustrates one form of circuit diagram for operation of the step diode as a counting device.

Figure 1:
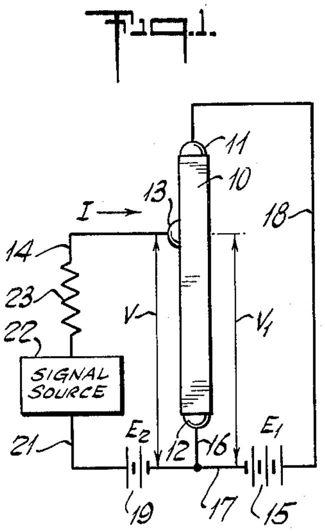
FIGURE 1 is a circuit diagram illustrating a conventional double base diode connected to perform a switching operation.

Referring now to FIGURE 1, the conventional double base diode comprises a body 10 of n-type germanium having ohmic contacts 11 and 12 on each end thereof. The body 10 is generally referred to as the base of the diode. A p-type junction 13 may be secured to any point on the base between the contacts 11 and 12, and a lead 14 is connected to the p-type junction 13.

A source of voltage having a magnitude $E_1$ as for instance the battery 15 is connected by means of leads 16, 17 and 18 to the contacts 12 and 11, and causes an electric current to flow through the base 10. The voltage drop in the base 10 between the junction 13 and contact 12 is represented as $V_1$. A second voltage $E_2$ produced by a battery 19 is applied between the contact 12 and the p-type junction 13, the circuit including lead 20, the battery 19, lead 21, the signal source 22, a resistor 23 and lead 14. The voltage appearing between the p-type junction 13 and ohmic contact 12 is denoted by the letter V. When the voltage $V_1$ and V are equal, current will not flow through the junction 13, and the voltage across the junction will be a maximum or peak value.

Figure 2:
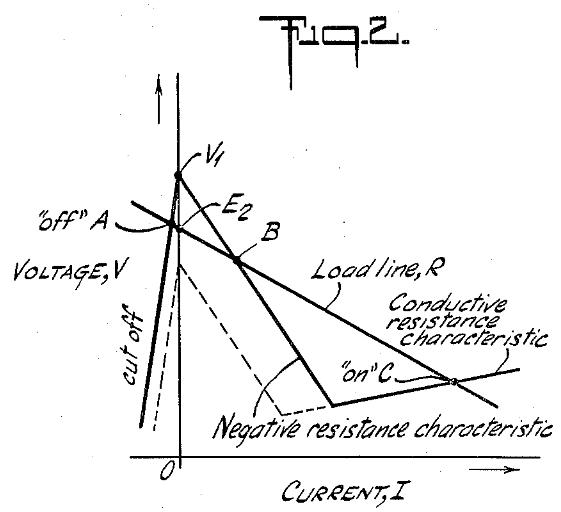
FIGURE 2 is a graph illustrating the voltage-current characteristic curve of the diode of FIG. 1.

Curves illustrating the operation of the circuit of FIG. 1 are illustrated in FIGURE 2. In this case the abscissa represents the current flowing through the junction 13, while the ordinate represents the voltage V as previously defined. It will be observed from the graphs that under an operating condition where the voltage is at a maximum, should the votages V and $V_1$ be proportioned so that current will flow through the junction in a direction opposite to the arrow I, the diode will be in the cut-off region shown to the left of the ordinate. On the other hand, if these voltages are proportioned so that current flows in the direction of the arrow I, the diode will exhibit a negative resistance characteristic and a continued increase in current I will produce a conductive characteristic.

When a voltage $E_2$ which is lower than the peak value of voltage $V_1$ is applied to the junction 13 through a resistor 23 a load line R may be drawn on the characteristic curve. This load line will intersect the ordinate at a voltage $E_2$ and the angle of the line will be a function of the resistance. By properly choosing values of $E_2$ and resistor 23 the load line will intersect the characteristic curve at points A, B and C. The point B at which the load line intersects the negative resistance portion of the characteristic is an unstable point and operation of the diode about this point produces a bistable condition since the circuit will be stable at the so-called "off" position A and also at the conducting position C. Under the condition where the diode is not in non-conductive or "off" position A, should a signal from the source 22 be applied so that the potential of the junction 13 exceeds $V_1$, the diode will automatically become conductive and it will remain conductive even when the applied signal from the source 22 is removed.

In the situation where the diode 10 of FIG. 1 is in the bistable condition as described above, if a positive hole exists in the portion of the base between the junction 13 and the contact 4, the peak value of the voltage V under a 0 current condition decreases as represented by the dotted line in FIG. 2. With this new characteristic only a single stable point is obtained, namely that of the conductive or "on" position. When the positive hole in the vicinity of the junction is removed, the characteristic curve assumes its original form and it is again bistable as described above.

Figure 3:
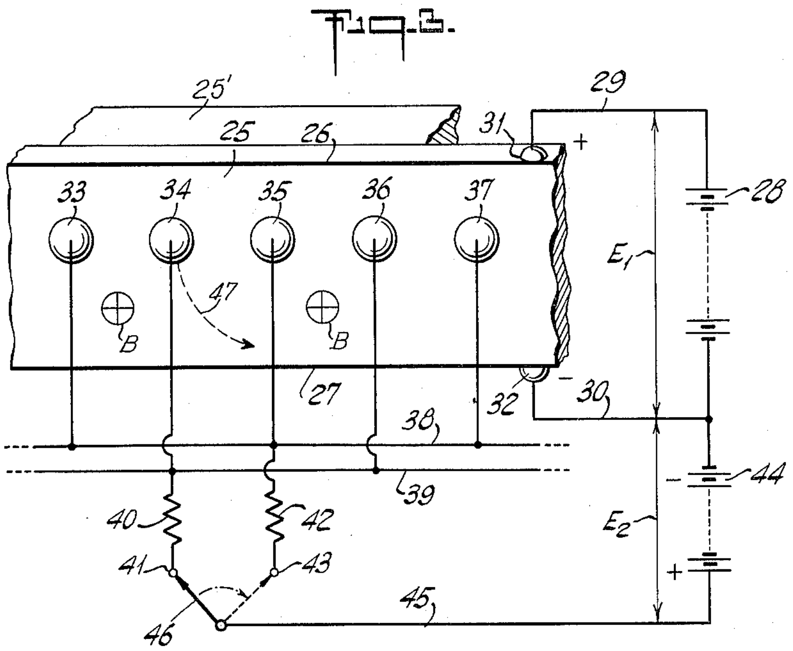
FIGURE 3 is a diagrammatical illustration of the step diode in accordance with the invention for the purpose of illustrating the principle of operation.

The instant invention utilizes a modified double base diode construction which in combination with an appropriate electromagnetic permanent field provides an exceedingly high speed switching device, one embodiment of which is diagrammatically illustrated in FIG. 3. In this figure, the body or base of the step diode is denoted by the numeral 25. In one form of the invention the base 25 may be in the form of a plate element as will be described having top and bottom surfaces 26 and 27. A battery 28 having a voltage $E_1$ is applied via the leads 29 and 30 to upper and lower contacts 31 and 32 respectively. Let it be assumed that the contact 31 is positive and the contact 32 is negative and that a current is caused to flow between the top and bottom surfaces 26 and 27. A plurality of p-type junctions are affixed to the surface of the base 25 and for purposes of simplicity only five such junctions have been illustrated and denoted by the numerals 33 to 37 inclusive. Alternate junctions as for instance 33, 35 and 37 are connected to a common conductor 38, while the intervening junctions such as 34 and 36 are connected to a second common conductor 39. The conductor 39 is connected via a load resistor 40 to one switch contact 41. The conductor 38 is connected via a load resistor 42 to a switch contact 43. A battery 44 having a voltage $E_2$ is connected at one end by the lead 30 and at the other side through a lead 45 to the movable switch contactor 46. It is also assumed for the purpose of this description that the voltage $E_2$ and the load resistors 40 and 42 are selected so that a bistable condition is obtained as described in connection with FIGS. 1 and 2. In addition, the body 25 is subjected to a magnetic field so that it intersects the body normal to the surface thereof (in the case of the present drawing, the field would be normal to the surface of the paper). Under these conditions and with the switch contactor 46 in the full line position illustrated, the junction 34 will become conductive due to a bias means (not shown) and will be stable in that conductive or "on" condition as described above maintaining junction 36 non-conductive or "off" condition. In this conductive condition positive holes will proceed downwardly from the junction 34 through the body 25 and by reason of the influence of the magnetic field they will travel to the right as indicated by the dotted arrow 47. These holes will proceed toward the base electrode 32 and will of course gradually disappear. When the switch is moved to contact 43 as shown by the dotted line, before the positive holes completely leave the body 25, the junction 35 will become conductive and assume its stable "on" position. This occurs by reason of the fact that junction 35 receives most of the influence of the remaining positive holes, and the peak point voltage of the N-letter characteristic is low. Even though the positive holes of the adjoining junction should disappear and the peak value of the characteristic increases, the "on" condition is nevertheless maintained because the structure is bistable under the "on" condition. When the switch 46 is returned to the original position at a high rate the junction 36 becomes conductive or in the so-called "on" position. Similarly, as the switch 46 is moved rapidly back and forth between the contacts 41 and 43 successive junctions will become conductive. By including appropriate means such as current measuring devices or the like in each junction accurate counting of the switch oscillations can be accomplished. The direction of operation of the device illustrated in FIG. 3 can be reversed by reversing the direction of the magnetic field which is utilized.

The curves illustrated in FIG. 2 utilizing the N-letter characteristic were obtained by utilizing a peak value for $V_1$ of 6 volts and a minimum value of .5 volt at the intersection of the conductive portions of the characteristic. In the case of FIG. 3 the resistors 40 and 42 may be of the order of 10,000 ohms each. Battery $E_1$ is approximately 10 volts while the battery $E_2$ is approximately 5 volts. The current during the stable conductive condition of each junction under the foregoing conditions was about 10 milliamperes utilizing a magnetic field of approximately 3,000 gauss. During the test the switch 41, 43, 46 was omitted and in its place a rectangular wave form having a peak value of one volt was applied to the resistors 40 and 42 in reversed phase relationship. Under these conditions counting was accomplished as described above at the rate of approximately 800 kilocycles.

One preferred embodiment of a step diode in accordance with the invention is illustrated in FIGS. 4*a* and 4*b*. In this form of the invention the base material 50 is in the form of a circular plate and the ohmic contacts 51 and 52 are secured to the periphery and center of the plate 50 respectively. The non-ohmic junctions 53 through 64 are secured to the surface of the plate between the center contact 52 and the peripheral contact 51. A magnet 65 is placed against the upper or back side of the plate 50 and produces a magnetic field through the plate in the manner previously described.

An alternate embodiment of the invention is shown in FIGURE 5. In this form the base material 66 is of tubular configuration having a top ohmic contact 67 and a bottom ohmic contact 68. The non-ohmic junctions 69*a*, 69*b*, etc. are spaced about the outer surface of the base 66 and a magnet 70 is disposed within the tubular base 66. It is evident, however, that the positions of the non-ohmic contacts *a*, *b*, etc. and the magnet 70 may be reversed in position if desired.

FIGURE 6 is a circuit diagram showing one mode of operation of a device such as the structure illustrated in FIG. 5 and the numerals of FIG. 5 identify corresponding elements in FIG. 6. It is apparent, however, that any other suitable configuration of a step diode in accordance with the invention may be utilized. A battery 71 having a voltage $E_2$ is applied between the upper and lower contacts 67 and 68 respectively, these contacts being diagrammatically illustrated in FIG. 6. The non-ohmic junctions 69*a*, *c*, *e*, etc. are connected to a common bus 72 while the intermediate junctions 69*b*, *d*, *f*, etc. are connected through individual pilot lamps 73*b*, 73*d*, and 73*f* to a second common bus 74. A square wave signal as indicated at 75 is applied to the terminal 76 and is fed through a load resistor 77 to the bus 72. At the same time, the square wave signal 75 is fed through a phase inverter 78 and a load resistor 79 to the bus 74. When the positive pulse 75 is applied to the terminal 76, the junction 69*a* will become conducting due to a bias means previously mentioned. At the same time a negative pulse is applied to the bus 74. When these pulses terminate the junction 69*b* will conduct and illuminate the pilot lamp 73*b*, and the junction 69*a* will become non-conducting. As this procedure is successively repeated, successive pilot lights 73*d*, *f*, etc. will become illuminated and thereby count the number of complete cycles. By the utilization of an appropriate magnetic field such as an electromagnetic field or other magnetic field that may be easily reversed, subtraction as well as addition can be performed. Furthermore, addition may be accomplished either in the clockwise or counterclockwise direction depending on the direction of the magnetic field, all as previously described.

While only certain embodiments of the invention have been illustrated and described, it is apparent that alterations, modifications and changes may be made without departing from the true scope and spirit of the invention as defined by the appended claims.

What is claimed is:

1. A semiconductor step diode comprising a body of semiconductor material, a pair of spaced ohmic contacts on said body, means for applying a voltage between said ohmic contacts to produce an electric field in said body, a plurality of non-ohmic junctions on said body and electrically disposed between said ohmic contacts, and a magnet for generating a magnetic field in said semiconductor body to deflect the current path through said body from said non-ohmic junctions to one of said ohmic junctions.

2. A semiconductor step diode according to claim 1 wherein said body is in the form of a plate having a conductive peripheral member electrically contacting the periphery of said plate, one of said ohmic contacts is connected to said peripheral member, the other ohmic contact is connected to the center of said plate and said non-ohmic junctions are spaced about the area of said plate between the ohmic contacts.

3. A semiconductor step diode according to claim 2 wherein said magnet is positioned on one side of said plate.

4. A step diode comprising a tubular body of semiconductor material, ohmic contacts on opposing edges of said body, means for applying a voltage between said ohmic contacts to produce an electric field in said semiconductor material, a plurality of non-ohmic contacts spaced about the surface of said body, and a magnet for generating a field through said body.

5. An electronic device comprising a body of semiconductor material, means including a power source for passing a current through said body and producing an electric field therein, a plurality of non-ohmic contacts on said body and influenced by said current, means including a bias source and load resistors connected to said non-ohmic contacts for applying a voltage thereto, a magnet for generating a magnetic field in said body for influencing the flow of current in said body, means for applying signal pulses to said non-ohmic contacts to cause said contacts to become successively conductive, and means indicating the number of non-ohmic contacts rendered conductive.

6. A step diode comprising a semiconductor lamella, a pair of ohmic contacts provided in spaced relationship on said lamella, means for applying a voltage between said ohmic contacts to produce an electric field in said lamella, a plurality of non-ohmic contacts arranged on said lamella between said ohmic contacts, means for applying electric charges to said ohmic contacts to cause the contacts to become successively conductive, and a magnet for generating a magnetic field through said lamella for deflecting a charge from a selected non-ohmic contact toward an adjoining ohmic contact and in the direction of the next successive non-ohmic contact.

References Cited by the Examiner

UNITED STATES PATENTS

| | | | |
|---|---|---|---|
| 2,655,607 | 10/53 | Reeves | 307—88.5 |
| 2,851,615 | 9/58 | Sziklai | 307—88.5 |
| 2,856,544 | 10/58 | Ross | 307—88.5 |
| 2,889,469 | 6/59 | Green | 307—88.5 |
| 2,910,634 | 10/59 | Rutz | 307—88.5 |
| 2,922,898 | 1/60 | Henisch | 307—88.5 |

ARTHUR GAUSS, *Primary Examiner.*